No. 841,818. PATENTED JAN. 22, 1907.
C. E. & O. W. ROBERTS.
MACHINE FOR CUTTING BUTTER OR THE LIKE MATERIAL.
APPLICATION FILED SEPT. 6, 1906.
3 SHEETS—SHEET 1.
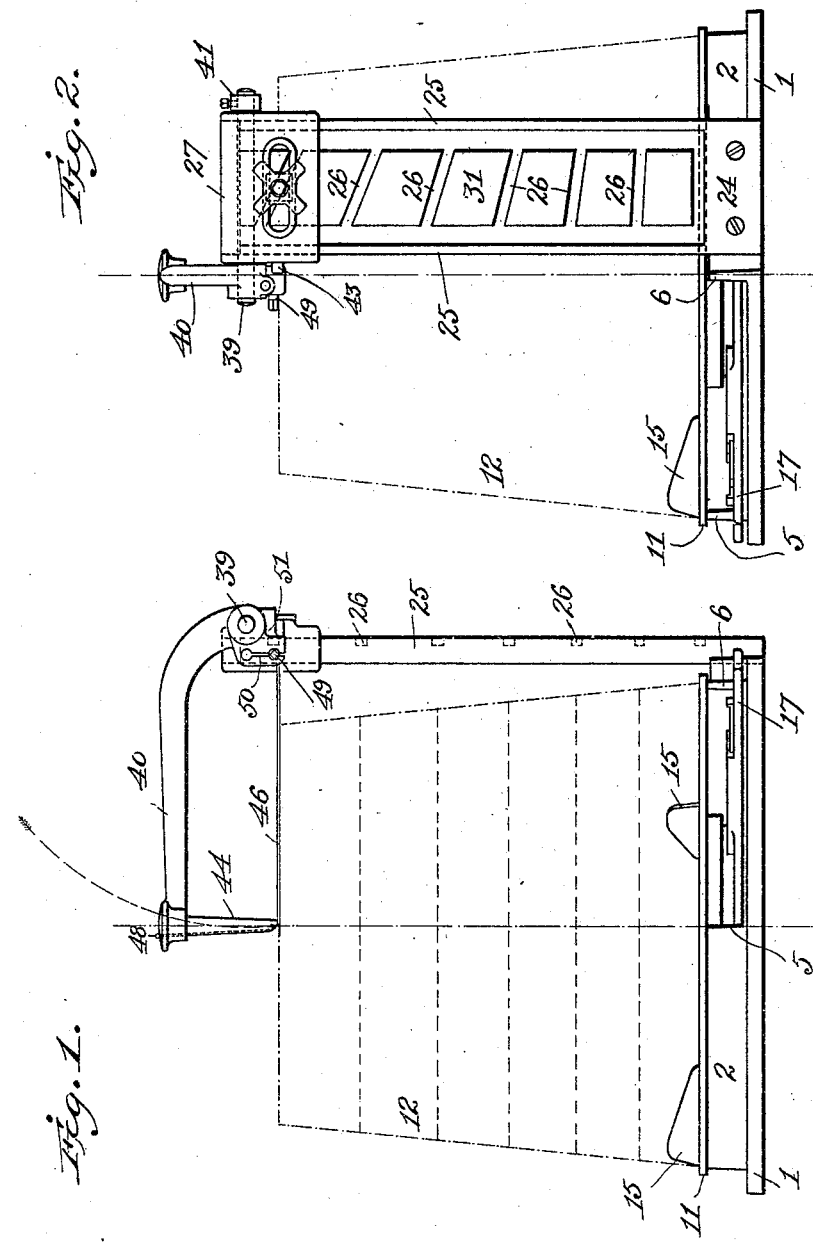
WITNESSES:
Edwin L. Jewell
J. H. Holt
INVENTORS
Charles E. Roberts
Owen W. Roberts
BY
W. Schoenborn
ATTORNEY No. 841,818. PATENTED JAN. 22, 1907.
C. E. & O. W. ROBERTS.
MACHINE FOR CUTTING BUTTER OR THE LIKE MATERIAL.
APPLICATION FILED SEPT. 6, 1906.
3 SHEETS—SHEET 2.
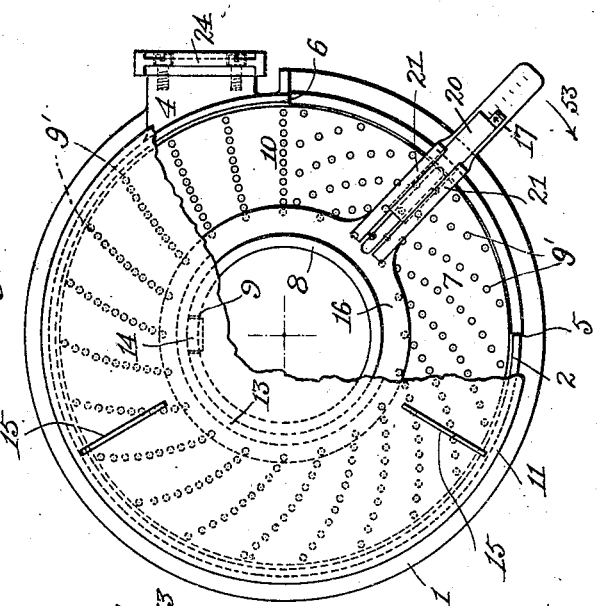
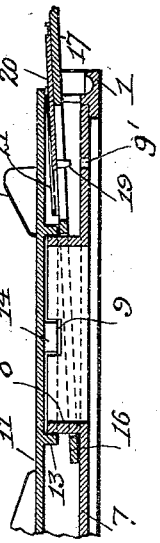
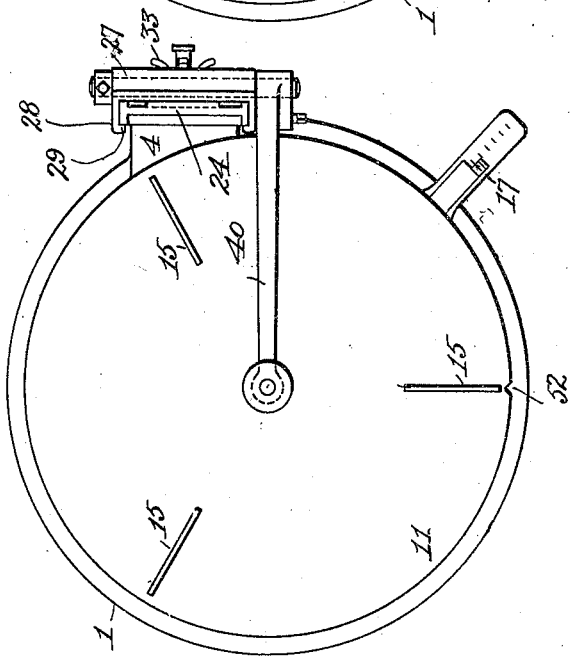
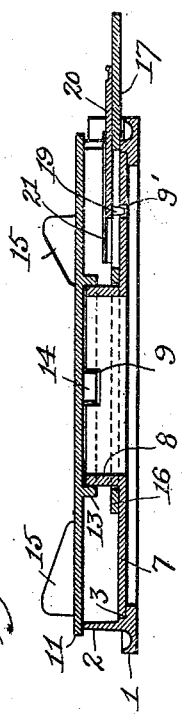
WITNESSES:
Edwin L. Jewell
J. H. Holt
INVENTORS
Charles E. Roberts
Owen W. Roberts
BY
W. Schoenborn
ATTORNEY

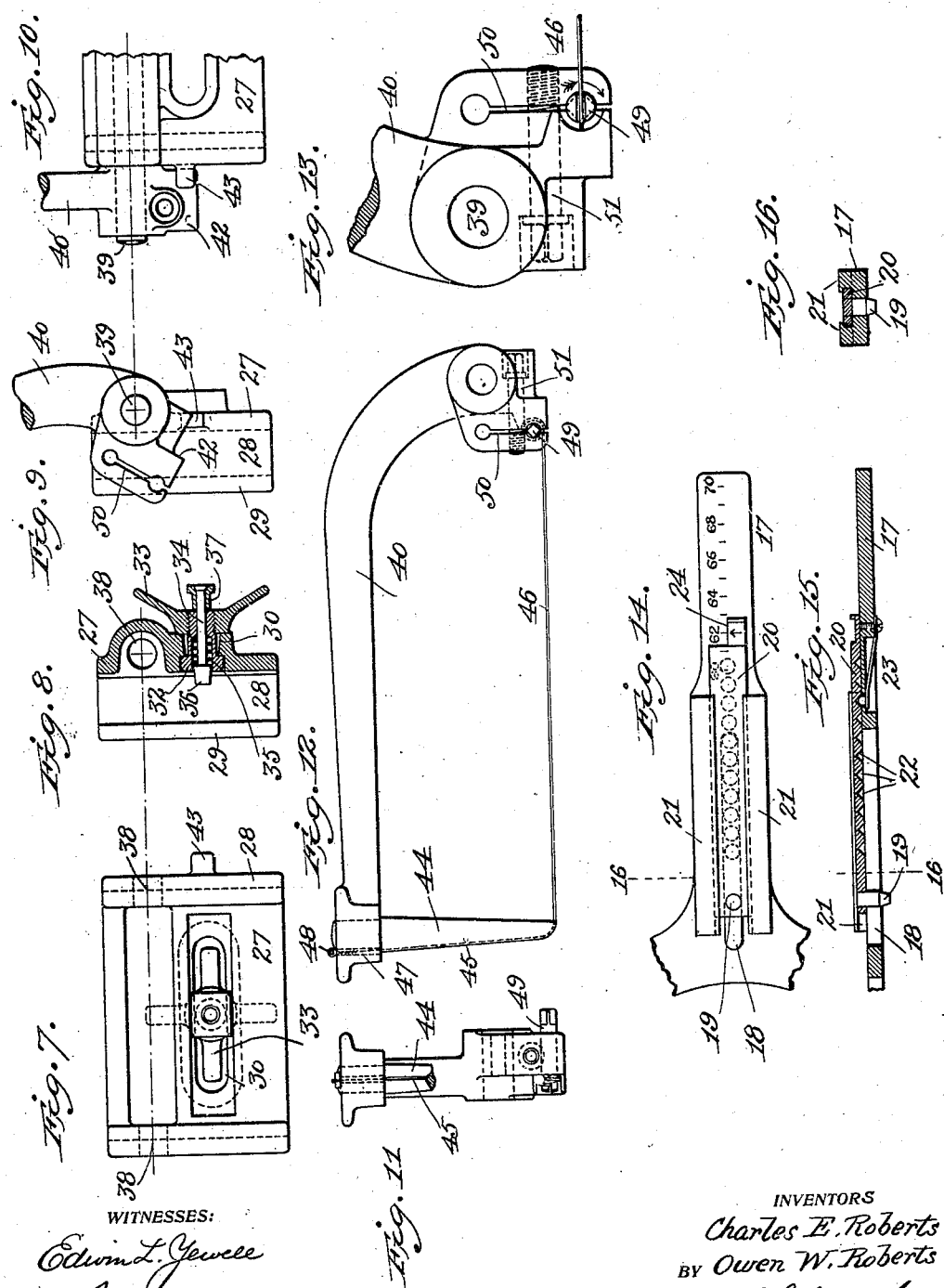

UNITED STATES PATENT OFFICE.

CHARLES E. ROBERTS AND OWEN W. ROBERTS, OF CHICAGO, ILLINOIS.

MACHINE FOR CUTTING BUTTER OR THE LIKE MATERIAL.

No. 841,818.      Specification of Letters Patent.      Patented Jan. 22, 1907.

Application filed September 6, 1906. Serial No. 333,489.

*To all whom it may concern:*

Be it known that we, CHARLES E. ROBERTS and OWEN W. ROBERTS, citizens of the United States, residing at Chicago, in the county of Cook and State of Illinois, have invented certain new and useful Improvements in Machines for Cutting Butter or the Like Material, of which the following is a specification.

Our invention relates to machines designed to cut blocks of butter of predetermined weight from cakes of butter of frusto-conical form and variable height and weight as obtained from the tubs used in commerce for packing and shipping butter; and the purpose of our invention is to improve and simplify the construction and to increase the accuracy of operation of such butter-cutting machines, an example of which is shown in the United States patent to Edwin K. Carter, No. 813,858, February 27, 1906, for a machine for cutting butter, &c.

Our invention consists in structural features and relative arrangements of elements, which will be hereinafter more fully and clearly described, and particularly pointed out in the appended claims.

Referring to the accompanying drawings, in which the same reference-numerals indicate the same parts in the several figures, Figure 1 is an elevation of our machine and showing in dotted lines a cake of butter to be operated upon. Fig. 2 is a similar elevation of the machine as seen from a position to the right of Fig. 1. Fig. 3 is a plan view. Fig. 4 is a similar view, the carriage and cutting member having been removed and a portion of the supporting-platform broken away. The holes in the index-plate under the remaining portion of the platform are shown in this veiw for the purpose of better illustrating the index-plate. Fig. 5 is a central section through the lower portion of the machine. Fig. 6 is a similar fragmentary view. Fig. 7 is a view of the carriage for supporting the cutting device. Fig. 8 is a sectional view thereof centrally through Fig. 7. Figs. 9 and 10 are fragmentary views of a portion of the carriage and cutter-arm carried thereby. Fig. 11 is a view of the cutting device illustrated in Fig. 12 as seen from a point to the left of Fig. 12. Fig. 12 is an elevation of the cutter-arm and cutting-wire carried thereby. Fig. 13 is an enlarged view of a portion of the cutter-arm, showing the adjusting and securing means for the cutting-wire. Fig. 14 is a plan view of the weight-gage and a portion of the lever for operating the turn-table. Fig. 15 is a section of the device as shown in Fig. 14. Fig. 16 is a section on the line 16 16 shown in Figs. 14 and 15.

1 is the base-plate of the machine, said base being annular in form and provided with an upwardly-extending rim portion or supporting member 2, a rabbet 3, and a projection 4. About one-quarter of the rim portion is cut away, as shown in Figs. 1, 2, and 4, the ends of the portion remaining forming stops, as shown at 5 and 6.

7 is an index-plate, circular in form, resting in the rabbet 3 of the base 1 and free to rotate therein, but restrained from other movement.

8 is an upwardly-extending annular flange formed in one piece with the index-plate and has a notch 9 formed in its upper edge. This index-plate is provided with a large number of holes 9', as shown, arranged in a series of concentric circles, the holes in each series being spaced equally and the distance between adjacent holes in the several concentric series increasing from the inner to the outer series, whereby the index-plate is graduated, in the instance shown so that the distance between two adjacent holes of any circle represents one-half pound of butter. The spacing of the series of concentric circles is preferably started from a radial line, as indicated at 10, Fig. 4.

11 is a rotary platform or turn-table movable about a vertical axis and upon which the cake of butter rests, as shown at 12 in dotted lines in Figs. 1 and 2. The periphery of this turn-table rests upon and is supported by the rim portion 2 of the base 1. It is provided with a downwardly-extending annular flange 13, which engages the flange 8 of the index-plate and is thus prevented from moving in a horizontal direction upon the base. Said turn-table is provided with a lug 14, which fits into the notch 9 of the annular flange 8. It will therefore be seen that the index-plate 7 drives the turn-table 11 through the flange 8, notch 9, and lug 14 and that the flanges 8 and 13 and rabbet 3 restrain the turn-table from all movement except one about its vertical axis.

The turn-table is provided with radial upwardly-projecting ribs 15, arranged near the periphery thereof, for the purpose of engaging the cake of butter to keep it from slipping therefrom and to cause it to turn therewith.

An operating member for the index-plate 7 is provided, comprising a ring-like portion 16, fitting somewhat loosely about the flange 8, and an arm or lever 17, formed in one piece with and extending from said ring-like portion. The arm or lever is shown enlarged in Figs. 14 and 15 and is provided with a slot 18, in which moves a pin 19, carried by a sliding member or slide 20, moving in guides 21. The under side of the slide 20 is provided with a series of notches or depressions 22, engaged by a spring-pressed pin, as shown at 23, which construction permits longitudinal movement of said slide 20, while at the same time providing sufficient resistance to such movement to prevent accidental displacement thereof. The end of the arm or lever 17 is provided with a scale having graduations indicating the net weight in pounds of the ordinary tubs of butter, which weight has been found to lie between sixty and seventy pounds, as indicated. The slide 20 is provided with an indicating-mark at 24.

The pin 19 is adapted to engage the holes in the index-plate 7, and the spacing of the holes in said plate is so calculated that when the slide 20 is set for a given net weight of butter on the turn-table—for example, sixty-three pounds—the pin 19 will be in position to engage with a definite circular series of holes in the plate, in which series the distance between adjacent holes corresponds to definite weights of butter—in this instance to one-half pound.

The looseness of the ring portion 16 of the operating member permits the lever 17 to be raised, as shown in Fig. 6, to disengage the pin 19 from the holes in the index-plate. The operating member moves in the opening left by the cut-away portion of the rim 2 and between the stops 5 and 6 formed by the ends of the remaining parts of said rim.

24 is a combined supporting-standard and dividing-plate secured in an upright position to the projection 4 of the annular base by screws or equivalent fastening means.

25 25 are flanges which form guides for the carriage, hereinafter described. Said flanges are connected by a web portion 31, which web is provided with a series of grooves 26, whereby the web also serves as a dividing-plate to determine the different vertical positions of the cutting-wire in order that the butter upon the turn-table may be cut into layers of equal weight or volume.

27 is a carriage adapted to support the cutting member and is provided with side pieces or slides 28 28, having projections 29, whereby the carriage engages the flanges or guides 25 of the standard and is free to move vertically thereon, but is restrained from movement in other directions.

The carriage 27 is provided with a horizontal slot 30, in which moves a hollow bolt 32, threaded at its outer end and provided with a wing-nut 33. This bolt has a hole extending longitudinally therethrough, in which moves a stop-pin 34, provided with a spring 35 to force it toward the standard. The inner end 36 of this pin is adapted to engage the grooves 26 of the web portion of the standard, while the outer end thereof is provided with a head 37, by means of which the pin can be withdrawn from the groove and the carriage moved vertically upon the standard.

Extending across the carriage and supported in bearings 38 in the side pieces 28 thereof is a shaft 39, carrying at one end the cutter-arm 40 and having a collar and set-screw 41 at the other end thereof. Said shaft is free to oscillate in its bearings, thus permitting the cutter-arm to be raised and lowered, and said arm is provided with a shoulder 42, which engages a lug 43 upon the carriage to limit the downward movement of the arm and keep the cutting-wire from falling below a horizontal position.

44 is a wire-supporter, circular in cross-section, supported in an opening at the free extremity of the cutter-arm. Said supporter is provided with a groove along its surface, as shown at 45, which groove secures the wire 46 against displacement. The arm 40 is provided with a slot at 47.

46 is the cutting-wire, having an enlarged end 48. Said wire is threaded through the shaft 47 and stretched between the supporter 44 and a tightening-pin 49, having a slotted end, as shown in Fig. 13, and carried by the inner end of the arm 40 and provided with a squared end, whereby it may be turned to adjust the tension of the wire. The bearing in which the pin 49 is supported is split, as shown at 50, and 51 is a screw whereby the bearing may be tightened to hold the pin 49 from turning after the wire has been stretched, as shown in Fig. 12.

The grooves 26 are the *loci* of the different heights or distances which the cutting-wire is placed above the plane of the turn-table in order to cut frusto-conical cakes of butter of different heights into layers of equal weight or volume, and the machine illustrated is designed to cut the cake of butter into six superposed layers of equal weight.

The operation of the machine is as follows: The butter having been transferred from the tub in which it is packed to the turn-table and the net weight thereof having been determined, the slide is set so that the indicating-mark 24 thereof is opposite the point on the scale corresponding to the weight of the butter cake. The cutter-arm 40 is then turned down into a horizontal position, the wing-nut 33 loosened, the end 36 of pin 34 placed in the upper end of the highest slot 26, and the bolt 32 gradually pushed to the right, as shown in Fig. 1, thereby permitting the carriage to move downward until the cutting-wire comes into contact with the upper surface of the butter cake, and the nut 33 is then tightened The stop-pin 34 is now withdrawn from the uppermost groove 26, the carriage is allowed to move down upon the standard until the pin drops into the next lower groove, and the wire-support 44 forced into the butter until the cutting-wire occupies a horizontal position. The turn-table is now turned to bring the radial line of openings 10 adjacent to the stop 6, for which purpose the table is provided with an indicating-notch 52, the operating member lifted, as shown in Fig. 6, and moved backward into contact with the stop and depressed, the pin 19 entering some one of the radial line of holes at 10. The operating member is now moved forward in the direction of the arrow 53 until it comes into contact with the stop 5.

The machine is now in condition to perform its intended function of cutting segmental blocks of butter of known or predetermined weight from the butter cake on the turn-table. The cutting-wire 46 is first forced down into the cake until it is in a horizontal plane, or a plane parallel to the plane of the turn-table 11. The turn-table is rotated so that the superposed cake of butter is forced against the cutting-wire 46 and revolved until the cutting-wire 46 is again at the point through which it was forced down into the cake. The cutter-arm is then raised, and its wire 46 is made to pass through the slit first made in the cake of butter. The operating member is then moved backward the desired number of half-pounds, which is equal to the number of holes 9' passed over by the pin 19. Said operating member is then brought forward to the stop 5, when the properly-determined weight of butter is measured off. By again depressing the cutting-wire 46 into the cake of butter a segmental section of butter of desired weight is cut from and can be easily removed from the upper section of the cake. The cutting-wire is again raised and the operations as above indicated are repeated.

After a horizontal layer has been disposed of the pin 34 is again withdrawn and the carriage depressed until said pin enters the next lower groove 26 of the dividing-plate, when the cutting operations are repeated.

It will be seen that the purpose of the dividing-plate 31 is to provide a device for determining successive vertical positions of the carriage and cutting-wire such that horizontal planes through said wire will divide a butter cake of frusto-conical form and of any height within the limits of adjustability of the machine into a series of superposed layers of equal weight or volume and that the purpose of the sliding bolt 32 is to adjust the machine so that the particular butter cake upon the turn-table will be divided into such a series of layers of equal weight.

It is not true in every case that the distance between the adjacent holes 9' in the index-plate 7 is equal, as will be seen upon examination of Fig. 4, at the starting-point, (marked 10.) The distance between the holes 9' is equal when the total number of pounds in a cake is divisible by three, as sixty, sixty-three, sixty-six, and sixty-nine, and the half-pound sections come out even. In cakes having sixty-one, sixty-four, and sixty-seven pounds there will be an odd one-third of one-half pound, while in cakes having sixty-two, sixty-five, or sixty-eight pounds there will be an odd two-thirds of one-half pound.

Having thus described our machine and explained the mode of operation thereof, we claim as our invention, and desire to secure by Letters Patent—

1. A machine for cutting butter or the like material, comprising a supporting-base, a rotary platform supported thereby, an upright standard, a carriage adjustable to successive positions upon said standard, a cutting member carried by said carriage, and a stationary dividing-plate and means carried by the carriage and coöperating with said dividing-plate for determining successive positions of the carriage and cutting member such that horizontal planes through the cutting member when in its successive positions will divide a butter cake resting upon the platform into a series of layers of equal weight.

2. A machine for cutting butter or the like material, comprising a supporting-base, a rotary platform supported thereby, an upright standard secured to said base, a carriage adjustable to successive positions upon said standard, a cutting member carried by said carriage, a stationary dividing-plate and means carried by the carriage and coöperating with said dividing-plate for determining successive positions of the carriage and cutting member such that horizontal planes through the cutting member when in its successive positions will divide a cake of butter resting upon the platform into a series of layers of equal weight, and means for rotating said rotary platform.

3. A machine for cutting butter or the like material, comprising a supporting-base, a rotary platform supported thereby, an upright standard secured to said base, a carriage adjustable to successive positions upon said standard, a cutting member carried by said carriage, a stationary dividing-plate and means carried by the carriage and coöperating with said dividing-plate for determining successive positions of the carriage and cutting member such that horizontal planes through the cutting member when in its successive positions will divide a butter cake resting upon the platform into a series of layers of equal weight, means for rotating the said rotary platform, and means for determining the angular distance through which said platform is rotated.

4. A machine for cutting butter or the like material, comprising a supporting-base, a rotary platform supported thereby, an upright standard secured to said base, a carriage movable upon said standard, a cutting member carried by said carriage, a stationary dividing-plate provided with a series of inclined grooves, a pin carried by the carriage and adapted to engage said grooves, means whereby the pin may be disengaged from said grooves, means for moving said pin in a horizontal direction to thereby adjust the cutting member, and means for rotating said rotary platform.

5. A machine for cutting butter or the like material, comprising a supporting-base, a rotary platform supported thereby, an upright standard secured to said base, a carriage movable upon said standard, a cutting member carried by said carriage, a stationary dividing-plate provided with a series of inclined grooves, a horizontal slot in said carriage, a hollow bolt adjustable in said slot, a nut for securing the bolt in its adjusted position, a pin movable in said hollow bolt and adapted to engage said grooves, and means for rotating said rotary platform.

6. A machine for cutting butter or the like material, comprising a supporting-base, a rotary platform supported thereby, an upright combined standard and dividing-plate secured to said base and comprising side flanges and a web connecting said flanges, said web being provided with a series of inclined surfaces, a carriage movable upon and guided by said flanges, a cutting member carried by said carriage, means carried by said carriage for engaging said inclined surfaces, said means being movable in a horizontal direction to thereby adjust the cutting member, and means for rotating said rotary platform.

7. A machine for cutting butter or the like material, comprising a supporting-base, a rotary platform supported thereby, an upright combined standard and dividing-plate secured to said base and comprising side flanges and a web connecting said flanges, said web being provided with a series of inclined grooves, a carriage movable upon and guided by said flanges, a cutting member carried by said carriage, a pin carried by said carriage, and adapted to engage said grooves, means whereby the pin may be disengaged from said grooves, means for moving said pin in a horizontal direction to thereby adjust the cutting member, and means for rotating said rotary platform.

8. A machine for cutting butter or the like material, comprising a supporting-base, a rotary platform supported thereby, an upright combined standard and dividing-plate secured to said base and comprising side flanges and a web connecting said flanges, said web being provided with a series of grooves, a carriage movable upon and guided by said flanges, a cutting member carried by said carriage, a horizontal slot in said carriage, a hollow bolt adjustable in said slot, a nut for securing said bolt in its adjustable position, a pin movable in said hollow bolt and adapted to engage said grooves, and means for rotating said rotary platform.

9. A machine for cutting butter or the like material, a supporting-base, a rotary platform supported thereby, an upright standard secured to said base, a carriage movable upon said standard, a horizontal shaft supported in bearings in said carriage, a cutting member carried by said shaft, a stationary dividing-plate provided with a series of inclined grooves, a pin carried by the carriage and adapted to engage said grooves, means whereby the pin may be disengaged from said grooves, means for moving said pin in a horizontal direction to thereby adjust the cutting member, and means for rotating said rotary platform.

10. A machine for cutting butter or the like material, comprising a supporting-base, a rotary platform supported thereby, an upright combined standard and dividing-plate secured to said base and comprising side flanges and a web connecting said flanges, said web being provided with a series of inclined surfaces, a carriage movable upon and guided by said flanges, a horizontal shaft supported in bearings in said carriage, a cutting member carried by said shaft and capable of oscillatory movement about the axis thereof, stops for limiting the downward movement of said cutting member, means carried by said carriage for engaging said inclined surfaces, said means being movable in a horizontal direction to thereby adjust the cutting member, and means for rotating said rotary platform.

11. A machine for cutting butter or the like material, comprising a supporting-base, a rotary platform supported thereby, an upright combined standard and dividing-plate secured to said base and comprising side flanges and a web connecting said flanges, said web being provided with a series of grooves, a carriage movable upon and guided by said flanges, a horizontal shaft supported in bearings in said carriage, a cutting member carried by said shaft and capable of oscillatory movement about the axis thereof, stops for limiting the downward movement of said cutting member, a horizontal slot in said carriage, a hollow bolt adjustable in said slot, a nut for securing said bolt in its adjusted position, a pin movable in said hollow bolt and adapted to engage said grooves, and means for rotating said rotary platform.

12. In a machine for cutting butter or the like material, a supporting-base, a rotary index-plate supported by said base, a rotary platform of circular form located above said index-plate, means extending upward from said base and contacting with said rotary platform near the periphery thereof to support said platform, a projection upon said index-plate adapted to engage said platform to drive it, and means for rotating said index-plate.

13. In a machine for cutting butter or the like material, a supporting-base, a rotary index-plate supported by said base, a rotary platform of circular form located above said index-plate, a supporting member extending upwardly from said base and contacting with said rotary platform near its periphery to thereby support said platform, a projection upon said index-plate adapted to engage said platform to drive it, and means for determining the angular distance through which said index-plate is rotated.

14. In a machine for cutting butter or the like material, a supporting-base, a rotary plate supported by said base, a rotary platform of circular form located above said plate, means extending upwardly from said base and contacting with said rotary platform near its periphery thereof to support said platform, a projection upon said plate adapted to engage said platform to drive it, and means for rotating said plate.

15. In a machine for cutting butter or the like material, a supporting-base having an upwardly-extending rim annular in form but cut away for a part of its length, a rotary platform of circular form supported at its periphery by said rim, a rotary index-plate beneath said platform and supported on said base, means for connecting the index-plate and platform and means operable in the space left by the cut-away portion of said rim for rotating said plate and platform.

16. In a machine for cutting butter or the like material, a supporting-base having an upwardly-extending rim annular in form but cut away for a part of its length, a rotary platform of circular form supported at its periphery by said rim, a rotary index-plate located beneath said platform and supported by said base, a projection upon said index-plate adapted to engage said platform to drive it, and an operating member located between the platform and index-plate and operable in the space left by the cut-away portion of said rim for rotating said plate.

17. In a machine for cutting butter or the like material, a supporting-base having an upwardly-extending rim annular in form but cut away for a portion of its length, a circular rabbet formed in said base, a rotary platform of circular form supported at its periphery by said rim, a rotary index-plate supported at its periphery in said rabbet, a projection upon said index-plate adapted to engage said platform to drive it, and an operating member for said plate located between the platform and index-plate and operable in the space left by the cut-away portion of said rim, said operating member comprising a ring portion surrounding the said projection and a lever portion extending beyond the periphery of the rotary platform.

18. In a machine for cutting butter or the like material, supporting-base having an upwardly-extending rim annular in form but cut away for a part of its length, a circular rabbet formed in said base adjacent the lower limit of said rim, a rotary platform of circular form supported at its periphery by said rim, a rotary index-plate supported at its periphery in said rabbet, an annular flange provided with a notch in its upper surface and extending upwardly from said index-plate, a downwardly-depending annular flange upon said platform engaging said upwardly-extending flange and provided with a lug adapted to enter the notch aforesaid, and an operating member for said plate located between the platform and index-plate and operable in the space left by the cut-away portion of said rim, said operating member comprising a ring portion surrounding the flange on the index-plate and a lever portion extending beyond the periphery of the rotary platform.

19. In a machine for cutting butter or the like material, a supporting-base, a rotary index-plate supported by said base, a rotary platform of circular form located above said index-plate, a supporting member extending upwardly from said base and contacting with said rotary platform near its periphery to thereby support said platform, means for rotating said index-plate, and a driving connection through which rotary motion of the index-plate is transmitted, to the platform.

20. In a machine for cutting butter or the like material, a supporting-base having an upwardly-extending rim annular in form but cut away for a part of its length, a rotary platform of circular form supported at its periphery by said rim, a rotary index-plate located beneath said platform and supported by said base, an operating member for rotating said index-plate located between said platform and index-plate and operable in the space left by the cut-away portion of said rim, and a driving connection through which rotary motion of the index-plate is transmitted to the platform.

21. In a machine for cutting butter or the like material, a rotary plate circular in form having a plurality of series of holes arranged in circles concentric with the axis of said plate, the holes in each series being spaced equally and the space between adjacent holes in the several series increasing from the inner to the outer series, an upwardly-extending annular flange formed integral with said plate, an operating member comprising a ring portion surrounding said flange and a lever extending beyond the periphery of said plate, a slide adjustable in guides upon said lever and provided with a pin adapted to engage the holes in said plate, means for securing said slide against accidental displacement, a scale for indicating the position of said slide, and stops for limiting the movement of said operating member.

22. In a machine for cutting butter or the like material, a rotary plate having a series of holes arranged in a circle concentric with the axis of said plate, the holes being equally spaced, an operating-lever supported at its inner end upon said plate and extending beyond the periphery thereof, a pin carried by said lever and adapted to engage the holes in said plate, and stops for limiting the movement of said lever.

23. In a machine for cutting butter or the like material, a supporting-base having an upwardly-extending rim annular in form but cut away for a part of its length, a rotary platform supported by said rim, a rotary index-plate beneath said platform and supported on said base, means for connecting the index-plate and platform, and means operable in the space left by the cut-away portion of said rim for rotating said plate and platform.

24. In a machine for cutting butter or the like material, a supporting-base having an upwardly-extending rim annular in form but cut away for about one-fourth of its length, a circular rabbet formed in said base adjacent the lower limit of said rim, a rotary platform supported by said rim, a rotary index-plate beneath said platform and supported on said rabbet, means for connecting the index-plate and platform, and means operable in the space left by the cut-away portions of said rim for rotating said plate and platform.

25. In a machine for cutting butter or the like material, a supporting-base annular in form and having an upwardly-extending rim annular in form but cut away for a portion of its length, a rotary platform supported on said base, a projection 4 upon said base, an upright combined standard and dividing-plate secured to said projection and comprising side flanges and a web connecting said flanges, said web being provided with a series of grooves, a carriage movable upon and guided by said flanges, a cutting member carried by said carriage, a horizontal slot in said carriage, a hollow bolt adjustable in said slot, a nut for securing said bolt in its adjustable position, a pin movable in said hollow bolt and adapted to engage said grooves, and means for rotating said rotary platform.

26. In a machine for cutting butter or the like material, a supporting-base, a platform supported thereby, an upright standard having a series of grooves and attached to the base, a carriage movable on said standard and comprising guides and a web portion connecting said guides, horizontally-arranged bearings in said carriage, a cutting member supported in said bearings, a horizontal slot in said web portion, a hollow bolt adjustable horizontally in said slot, a nut for securing said bolt in its adjustable position, a pin slidable in said hollow bolt and adapted to engage the grooves of the standard.

27. In a machine for cutting butter or the like material, a supporting-base, a platform supported thereby, an upright standard attached to the base, a carriage adjustable on said standard, a supporting-shaft on said carriage, a cutter-arm supported at its inner end by said shaft, a wire support at the outer end of said cutter-arm, a groove extending along said wire support, a split bearing adjacent the inner end of said cutter-arm, a rotary pin in said bearing, a screw for compressing said bearing to thereby secure the pin against rotation, and a wire secured to the cutter-arm and lying in said groove and extending to said pin.

28. In a machine for cutting butter or the like material, a supporting-base, a platform supported thereby, a combined supporting-standard and dividing-plate attached to the base and comprising guiding-flanges, a web portion between the flanges and a series of inclined grooves in said web portion, a carriage movable on said standard and comprising guides and a web portion connecting said guides, horizontally-arranged bearings in said carriage, a horizontal slot in said web portion, a hollow bolt adjustable horizontally in said slot, a nut for securing said bolt in its adjustable position, a pin slidable in said hollow bolt, and adapted to engage the grooves of the standard.

29. In a machine for cutting butter or the like material, a supporting-base, a platform supported thereby, a combined supporting-standard and dividing-plate attached to the base and comprising guiding-flanges, a web portion connecting the flanges and a series of grooves inclined at progressively-increasing angles formed in said web portion, a carriage movable on said standard and comprising guides and a web portion connecting said guides, horizontally-arranged bearings in said carriage, a cutting member supported in said bearings, a horizontal slot in said web portion, a hollow bolt adjustable horizontally in said slot, a nut for securing said bolt in its adjustable position, a pin slidable in said hollow bolt, and adapted to engage the grooves of the standard.

In testimony whereof we affix our signatures in presence of two witnesses.

CHARLES E. ROBERTS.
OWEN W. ROBERTS.

Witnesses:
HARRY S. MEMSTEIN,
GEO. P. HENRY.